May 26, 1925.
R. C. SCHEURER ET AL
1,539,776
GAME
Filed Aug. 5, 1924
*Fig. 1.*
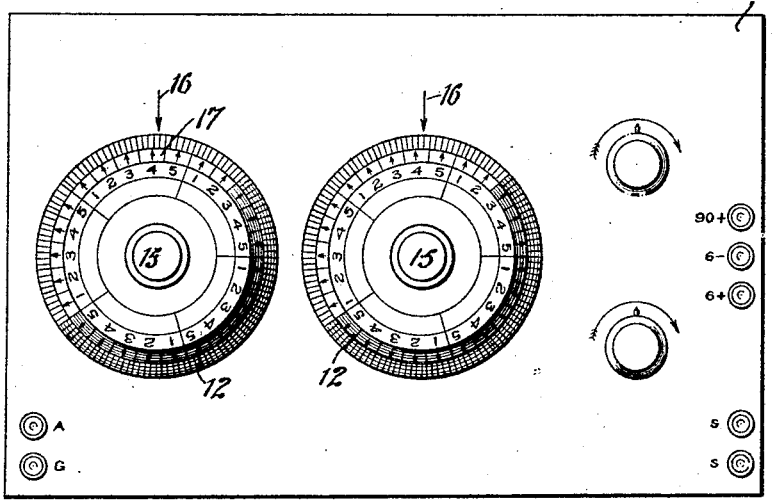
*Fig. 2.*
*Fig. 3.*
WITNESSES
INVENTOR
ROBERT C. SCHEURER
FRED GREENBERG
BY
ATTORNEYS Patented May 26, 1925.

1,539,776

UNITED STATES PATENT OFFICE.

ROBERT CHRISTIAN SCHEURER, OF WEST HOBOKEN, AND FRED GREENBERG, OF JERSEY CITY, NEW JERSEY.

GAME.

Application filed August 5, 1924. Serial No. 730,203.

*To all whom it may concern:*

Be it known that we, ROBERT C. SCHEURER and FRED GREENBERG, citizens of the United States of America, and residents, respectively, of West Hoboken, in the county of Hudson and State of New Jersey, and Jersey City, in the county of Hudson and State of New Jersey, have invented a new and Improved Game, of which the following is a description.

Our invention relates to a game apparatus involving a dial or dials bearing numbers or equivalent symbols and adapted to be turned so that various turnings will indicate particular symbols, said apparatus including a chart correlated to the dials in a novel manner, as well as a map correlated to the chart so that the turning of the dials will through the medium of the chart indicate locations on the map, the dials being of a character to simulate the dials on a radio receiver and the chart and map being given a character to represent radio broadcasting stations.

The general object of our invention is to provide a game apparatus embodying novel and interesting features making the game attractive in locating by dials various stations to theoretically "listen in" so that the winner may be considered that one of a group of players locating all the stations by means of the dials or locating with difficulty certain stations at given points as delineated on the map forming part of the apparatus.

The nature of our invention and its distinguishing features and advantages will clearly appear as the description proceeds.

Reference is to be had to the accompanying drawings forming a part of this specification, it being understood that the drawings are merely illustrative of one example of the invention.

Figure 1 is a plan view of a chart and map forming part of our novel game apparatus;

Figure 2 is a plan view of the dials forming part of the apparatus and showing the same in simulation of a radio receiver panel;

Figure 3 is a longitudinal section through the dials and their supporting panel.

In carrying out our invention in accordance with the illustrated example, a chart 10 is provided, and a map 11 here shown as produced in the central space on the chart 10. The numeral 12 indicates dials on a baseboard or panel 13; said dials are mounted to turn on vertical pins 14 and have central knobs 15 convenient for turning the same.

The dials 12 bear series of numbers which may run say from 1 to 5, the numbers being represented by repeats annularly about the dials. On the panel 13 are marks such as arrows 16, adjacent to each dial and areas 17 are produced on the dial and identified by each numeral or other symbol so that when the dial stops with a given area at an arrow 16, the numeral associated with such area will identify the same. The chart 10 has produced thereon the names of a multiplicity of the designations of radio stations such as WNYC, WCAP, etc. Associated with each station or location designated on the chart is a combination of numerals of the two dials 12, the combinations being the symbols 1–3, 5–2, etc., no two stations or locations on the chart having associated therewith the same numerals or other symbols.

The stations or locations appearing on the chart appear also in their proper geographical positions on the map 11. With the described arrangement the turning of the dial 12 will bring given numerals on the respective dials to the indicated points such as the arrows 16. If in the turning of the dials, the first dial indicates the numeral 1 at the arrow 16 and the other dial brings the numeral 3 at the other arrow 16, we have the combination 1–3, which identifies the location or transmitting station WNYC. Again, if the turning of the dials brings the numeral 1 on the first dial to the adjacent arrow 16 and the turning of the second dial brings the numeral 2 to the second arrow, we have the combination 1–2 which on the chart identifies the station WCAP. Thus, each of a group of players may seek to find the stations located at two distant points such as WNYC in New York and the station KFBG at Seattle. Thus, a player may reach the station not distant from Seattle, such as KEBB appearing on the map, whereas with the next turning of the dials by the same player, he may locate the station WCAP requiring him to return from the station near Seattle back to the station comparatively near New York or the starting point. When finally a player locates the distant station in the play such as Seattle, he has won the game.

Another interesting method of playing the game requires the players to list or make a memorandum of all the stations located by the turning of the dials and when finally all the stations on the chart and map have been located, the player succeeding in accomplishing this is declared the winner.

The panel 13, it will be observed, has various symbols thereon representing elements on the radio receiver panel and the dials 12 are accordingly made to simulate the graduated dials of a radio receiver.

We would state in conclusion that while the illustrated example constitutes a practical embodiment of the invention, we do not limit ourselves strictly to the exact details herein illustrated, since, manifestly, the same can be considerably varied without departure from the spirit of the invention as defined in the appended claims.

Having thus described our invention, we claim:

1. In a radio game apparatus, two dials each having symbols thereon, a chart having stations indicated thereon, each station having associated therewith various combinations of symbols corresponding with symbols on the respective dials, and a map having indicated thereon the stations which appear on the chart so that the turning of the dials will indicate by the associated symbols on the chart and dials the stations appearing on the map and chart.

2. In a game apparatus of the class described, two dials each having characters thereon, and a chart having stations indicated thereon, each station having associated therewith various combinations of characters corresponding with the characters on the respective dials.

ROBERT CHRISTIAN SCHEURER.
FRED GREENBERG.